(12) United States Patent
Omi

(10) Patent No.: US 7,194,355 B2
(45) Date of Patent: Mar. 20, 2007

(54) NAVIGATION SYSTEM

(75) Inventor: Masanori Omi, Gifu (JP)

(73) Assignee: Denso Corporation, Kariya (JP)

( * ) Notice: Subject to any disclaimer, the term of this patent is extended or adjusted under 35 U.S.C. 154(b) by 365 days.

(21) Appl. No.: 10/791,880

(22) Filed: Mar. 4, 2004

(65) Prior Publication Data
US 2004/0181336 A1    Sep. 16, 2004

(30) Foreign Application Priority Data
Mar. 10, 2003    (JP) ............... 2003-063508

(51) Int. Cl.
G01C 21/30    (2006.01)
G08G 1/0969    (2006.01)
(52) U.S. Cl. .............. 701/209; 701/201; 701/210; 340/995.19; 340/995.23
(58) Field of Classification Search ........... 701/201, 701/209, 210, 211; 340/988, 995.1, 995.2, 340/995.14, 995.19, 995.23, 995.24, 995.25
See application file for complete search history.

(56) References Cited

U.S. PATENT DOCUMENTS

| | | | |
|---|---|---|---|
| 4,992,947 A * | 2/1991 | Nimura et al. .............. 701/210 |
| 5,067,082 A * | 11/1991 | Nimura et al. .............. 701/208 |
| 5,410,486 A | 4/1995 | Kishi et al. |
| 5,737,225 A * | 4/1998 | Schulte ....................... 701/211 |
| 5,902,350 A * | 5/1999 | Tamai et al. ................ 701/211 |
| 6,038,509 A * | 3/2000 | Poppen et al. .............. 701/210 |
| 6,061,628 A * | 5/2000 | Hayashi et al. ............. 701/208 |
| 6,388,582 B2 * | 5/2002 | Yamashita et al. .......... 340/988 |

* cited by examiner

Primary Examiner—Tan Q. Nguyen
(74) Attorney, Agent, or Firm—Posz Law Group, PLC

(57) ABSTRACT

When a vehicle performs route calculation at a current position, the number of lanes at the current position is found. A predetermined correspondence between the numbers of lanes and straight prioritized distances is used to find a straight prioritized distance at the current position corresponding to the number of lanes. A route to a destination from the current position is calculated so as to include, in the route, a road to be followed for the straight prioritized distance from the current position. When there are many lanes, the straight prioritized distance is set to be long. Accordingly, it is possible to avoid calculating a route that causes a guide to sudden right or left turn. When there are a few lanes, the straight prioritized distance is set to be short. Accordingly, it is possible to avoid calculating a roundabout route to the destination.

19 Claims, 7 Drawing Sheets

INTERSECTION: Δ20m

| NO. OF LANES (L) | STRAIGHT PRIORITIZED DISTANCE (m) (S-P DISTANCE) |
|---|---|
| 1 | 30 |
| 2 | 100 |
| 3 | 150 |
| 4 | 200 |
| ⋮ | ⋮ |

| WIDTH (m) | STRAIGHT PRIORITIZED DISTANCE (m) (S-P DISTANCE) |
|---|---|
| 3.0 | 30 |
| 5.5 | 100 |
| 13.0 | 150 |
| ⋮ | ⋮ |

NAVIGATION SYSTEM

CROSS REFERENCE TO RELATED APPLICATIONS

This application is based on and incorporates herein by reference Japanese Patent Application No. 2003-63508 filed on Mar. 10, 2003.

FIELD OF THE INVENTION

The present invention relates to a navigation system.

BACKGROUND OF THE INVENTION

A conventional navigation system calculates routes so that a route to be traveled straight is prioritized. In this manner, the navigation system determines a route to a destination at a specified distance far away from the current position. The navigation system calculates routes by prioritizing a route to straight travel a specified distance ahead for the following reason. That is, when the route calculation is performed while traveling, the current position moves during a time from the start to the end of the route calculation. Consequently, the current position after the calculation does not match that before the calculation. In this case, for example, the current position may be determined immediately in front of an intersection immediately after the route guidance starts. A driver may be unexpectedly guided to turn right or left.

For this reason, it is necessary not to calculate the route for right or left turn immediately after the route guidance starts. Therefore, the navigation system prioritizes a straight route to calculate routes to the destination at a specified distance ahead from the current position before the calculation.

However, a distance to be traveled from the start to the end of the route calculation depends on traveling speeds. Accordingly, the distance to be traveled straight is not always ensured optimally. In consideration for this, it may be possible to change a distance to be traveled straight based on a traveling speed when the route calculation starts. However, the route may be unfavorable to a driver even after changing the distance to be traveled straight based on increased or decreased speeds.

For example, let us consider that a vehicle travels a road including many lanes such as four lanes per direction. When the vehicle speed is low, the distance to be traveled straight is changed to be short. Accordingly, it may be impossible to ensure a distance long enough to change lanes.

Alternatively, let us consider that a vehicle travels a road including a few lanes such as one lane per direction. When the vehicle speed is high, the distance to be traveled straight is changed to be long. However, the vehicle can turn right or left without changing the lane. A guidance to go straight is made even though the vehicle can turn right or left immediately, causing a roundabout route to the destination.

SUMMARY OF THE INVENTION

The present invention has been made in consideration of the foregoing. It is therefore an object of the present invention to provide a navigation system capable of calculating a route favorable to a driver even if routes are calculated while traveling.

To achieve the above object, a navigation system is provided with the following. A route from a current position to a destination is calculated by using stored map data including road attribute data. The route includes a road to be followed from the current position. Rout guidance to the destination is performed in accordance with the calculated route. Here, a distance of the road to be followed included in the route is changed according to a road attribute of the road to be followed. When a branch point for branching to another road from the road to be followed is set, the branch point is set after the distance is exceeded.

In this manner, the navigation system according to the present invention changes a distance of a road to be followed in accordance with a road attribute of the road. For example, the number of lanes is one of road attributes. When there are many lanes such as four lanes per direction, the distance of the road to be followed is changed to be long. When there are a few lanes such as one lane per direction, the distance of the road to be followed is changed to be short.

Typically, a time lag is generated from the timing when a route calculation is started to the timing when a route guidance after the route calculation is started. The above structure solves possible problems resulting from the moving of the vehicle's current position for the time lag as follows. When there are many lanes, the distance of the road to be followed included in the route becomes sufficient for a lane change. Accordingly, it is possible to avoid calculating a route that causes a guide to sudden right or left turn. When there are a few lanes, the distance of the road to be followed included in the route becomes short. Accordingly, it is possible to avoid calculating a roundabout route to the destination. As a result, it is possible to calculate a route favorable to the driver.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
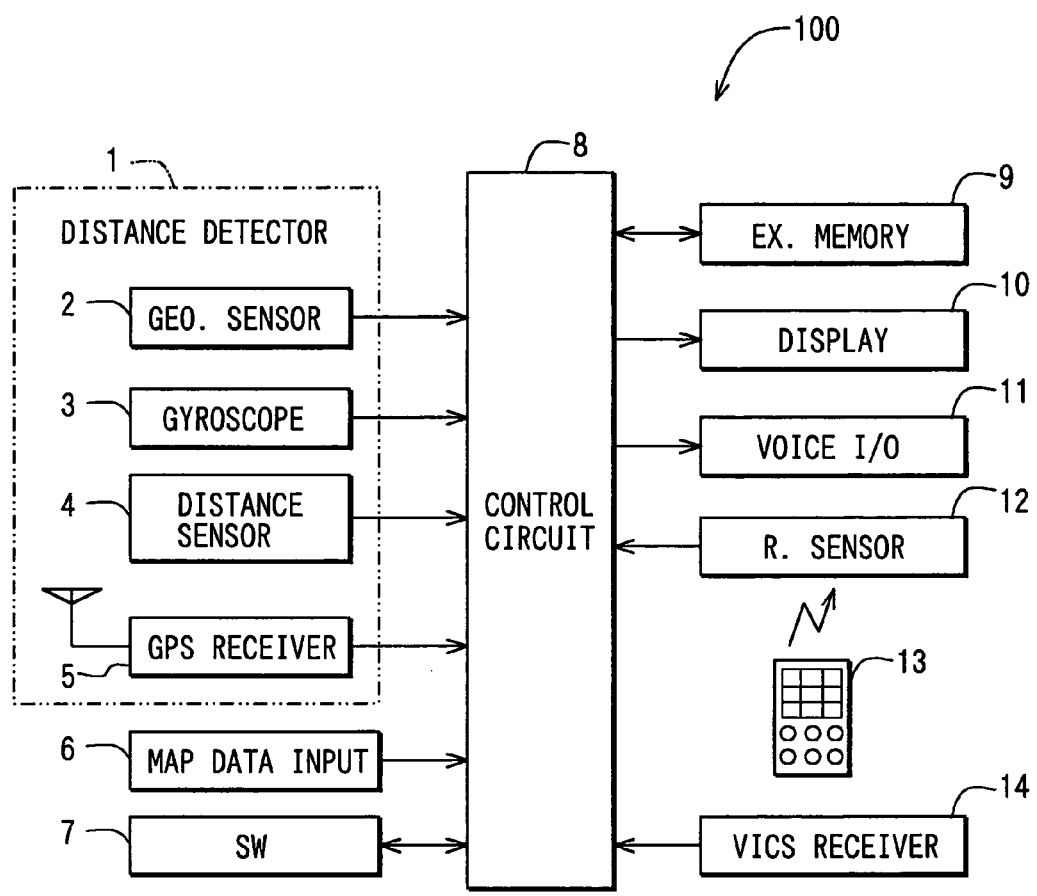
FIG. 1 is a block diagram schematically showing a configuration of a navigation system according to embodiments of the present invention.

FIG. 1 is a block diagram schematically showing a configuration of a navigation system according to embodiments of the present invention. As shown in FIG. 1, a navigation system 100 according to the embodiment includes a position detector 1, a map data input device 6, an operation switch group 7, an external memory 9, a display unit 10, a voice input/output unit 11, a remote control sensor 12, a VICS receiver 14, and a control circuit 8 connected to these components.

The control circuit 8 is configured to be an ordinary computer. The control circuit 8 internally includes a known CPU, ROM, RAM, I/O, and a bus line that connects these components. The ROM stores a program for the navigation system 100 to operate. According to this program, the CPU and the like perform specified calculations. The program can be obtained externally by means of the external memory 9.

The position detector 1 includes a known geomagnetic sensor 2, gyroscope 3, distance sensor 4, and GPS (Global Positioning System) receiver 5. The GPS receiver 5 detects vehicle positions based on radio waves from a satellite. These components have errors with different characteristics. Accordingly, a plurality of sensors is used to correct errors for the components to operate. Depending on accuracies of the sensors, part of the above-mentioned components may constitute the position detector 1. Further, it may be preferable to use a rotation sensor for steering, a vehicle speed sensor for rolling wheels, and the like (not shown).

The map data input device 6 supplies various data such as map data, road data, and the like. Upon request from the control circuit 8, the map data input device 6 transmits various data. Generally, a CD-ROM or DVD-ROM is used as a storage medium to store various data in terms of the amount of data. Further, it may be preferable to use the other writable storage media such as a memory card and a hard disk. The following describes link data, node data, and intersection data constituting road data.

First, roads on a map are divided into portions at a plurality of nodes, i.e., points at which the roads intersect, branch, and join. A link is defined between these nodes. Connecting links constitutes a road. The link data includes a unique number (link ID) to specify the link; a link length to indicate the length of the link; coordinates of nodes (e.g., latitude and longitude) to indicate the beginning and end of the link; a road name; a road type categorized as toll roads, national roads, and roads designated for prefectural and city governments and villages; a road width; the number of lanes; availability of exclusive right-turn and left-turn lanes; the number of such lanes if any; and a speed limit.

The node data includes a node ID, i.e., a unique number assigned to a node where each road on the map intersects, joins, or branches; coordinates of the node; a node name; a connection link ID to describe link IDs of all links connected to the node; and an intersection type.

The operation switch group 7 contains a touch switch or a mechanical switch configured integrally with the display unit 10. The operation switch group 7 is used for operations to scroll a map displayed on a screen of the display unit 10 and to enter letters and the like.

The display unit 10 includes a liquid crystal display, for example. A screen of the display unit 10 can display a vehicle position mark and a road map around the vehicle. The vehicle position mark corresponds to the vehicle's current position supplied from the position detector 1. The road map is generated from map data supplied from the map data input device 6.

The voice input/output unit 11 includes an input unit and an output unit (not shown). The input unit recognizes the contents of a user's oral instruction for various inputs to the navigation system 100. The output unit includes a speaker, an audiovisual amplifier, and the like for the voice guidance and the like.

The VICS receiver 14 receives road traffic information and the like distributed from VICS centers via beacons installed on roads and local FM broadcasting stations. The road traffic information includes, for example, names of congested roads; congested roads from the beginning to the end (e.g., coordinates of latitudes and longitudes); traffic congestion such as a traffic congestion level indicating the degree of traffic congestion; and traffic regulation information such as being closed to traffic or being closed at points of access or exit for expressways, and the like owing to accident or construction. The traffic congestion level is represented by a plurality of evaluation grades such as congested, crowded, and empty. The control circuit 8 processes the received road traffic information. For example, the traffic congestion, the traffic regulation information, and the like are overlapped with a map displayed on the screen of the display unit 10.

The navigation system 100 according to the embodiment has a so-called route guidance function. When a position of the destination is specified from the operation switch group 7, the remote controller 13, and the like, the route guidance function automatically selects an optimal route to the destination from the current position as a start point. Then, the route guidance function forms and displays a guided path. Further, a route reretrieval function is provided. When the current position deviates from the guided path during execution of the route guidance function, the route reretrieval function automatically forms a new path to the destination.

The technique to automatically find an optimal path uses a cost calculation according to the known Dijkstra algorithm. The technique calculates a path to the destination using a cost value assigned to each link at a minimum cost in consideration for the link length, the number of lanes, the road width, and the like.

These functions are mainly implemented by the control circuit 8 while performing various operations. When a destination is specified, the control circuit 8 calculates a path using map data and road data from the map data input device 6. The control circuit 8 displays the route on the display unit 10 and enlarges the map or provides a voice guidance at a branch point or an intersection to make a right or left turn.

The route guidance function according to the embodiment forms a guided path from a start point to the destination so as to prioritize a road to be followed at the start point (i.e., so as to prioritize traveling along a road where the start point exists). This road to be followed is hereafter referred to as a best followed road. Further, the route guidance function changes the length (or distance) of the best followed road to be traveled in accordance with the number of lanes at the start point.

When the route calculation is performed while a vehicle is running, the vehicle's current position moves from the beginning to the end of the route calculation. Therefore, the vehicle position before the calculation differs from that after the calculation. Immediately after the route guidance starts, for example, the vehicle may be positioned immediately in front of an intersection to turn right or left. As a result, a driver may be unexpectedly guided to turn right or left.

To solve this problem, the route guidance function according to the embodiment does not calculate a path to turn right or left immediately after the route guidance starts. The route guidance function calculates a path from the start point to the destination so as to prioritize the best followed road at the start point. Further, the route guidance function changes a distance of the road to be traveled from the start point in accordance with the number of lanes at the start point. That distance is hereafter referred to as a straight prioritized distance (S-P distance).

Figure 6:
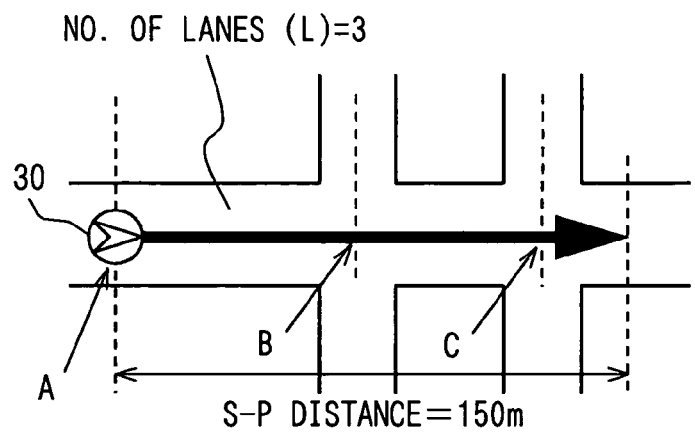
FIG. 6 shows an image of straight prioritized distance according to the first embodiment.
Figures 12, 13, 14:
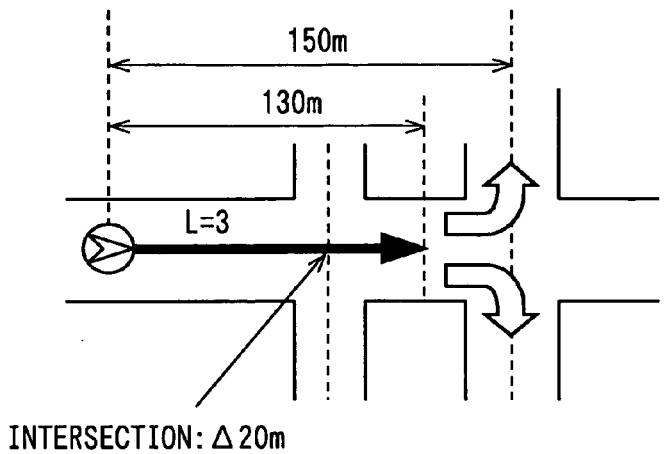
FIG. 12 shows an image of straight prioritized distance to be calculated according to a seventh embodiment in consideration for an intersection.
FIG. 13 shows correspondence between the number of lanes per link and a straight prioritized distance according to embodiments of the present invention.
FIG. 14 shows correspondence between a link width and a straight prioritized distance according to embodiments of the present invention.

For example, let us assume that a vehicle 30 is running and is positioned at point A when the route calculation is to be performed as shown in FIG. 6. The route guidance function references the number of lanes from link data corresponding to the road for point A. The route guidance function then finds a straight prioritized distance corresponding to the number of lanes referenced. For example, a storage device such as ROM is used to previously store the correspondence between the number of lanes and a straight prioritized distance as shown in FIG. 13. The straight prioritized distance can be found by applying the number of lanes to the correspondence. As shown in FIG. 13, the straight prioritized distance increases as the number of lanes increases. Consequently, it is possible to set a straight prioritized distance corresponding to the number of lanes.

Some modifications may be made to select a best followed road at the start point as a route for the straight prioritized distance ahead from the start point. For example, a possible modification may be to decrease the cost of links included in the straight prioritized distance. Another modification may be to increase the cost of a link not included in the straight prioritized distance. Yet another modification may be to prohibit retrieving a link that does not include the straight prioritized distance. After such modifications, the route calculation is performed. As shown in FIG. 6, the route guidance function calculates the straight prioritized distance (S-P DISTANCE=150 m in FIG. 6) corresponding to the number of lanes at point A. As a result of the route calculation, a route is formed which has no right or left turn from the best followed road at points B and C.

Figure 2:
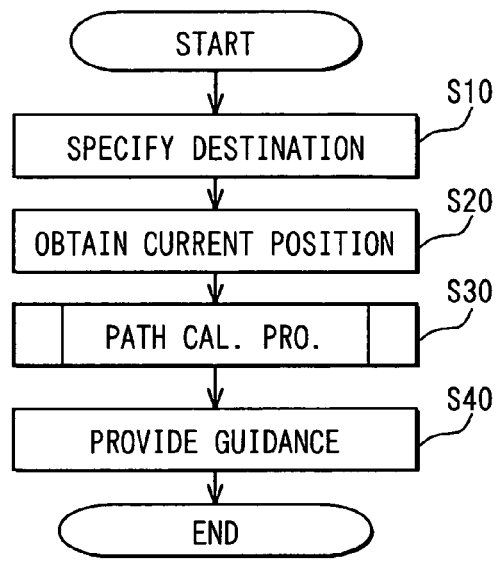
FIG. 2 is a flowchart showing a process of a route guidance function according to embodiments of the present invention.
Figure 3:
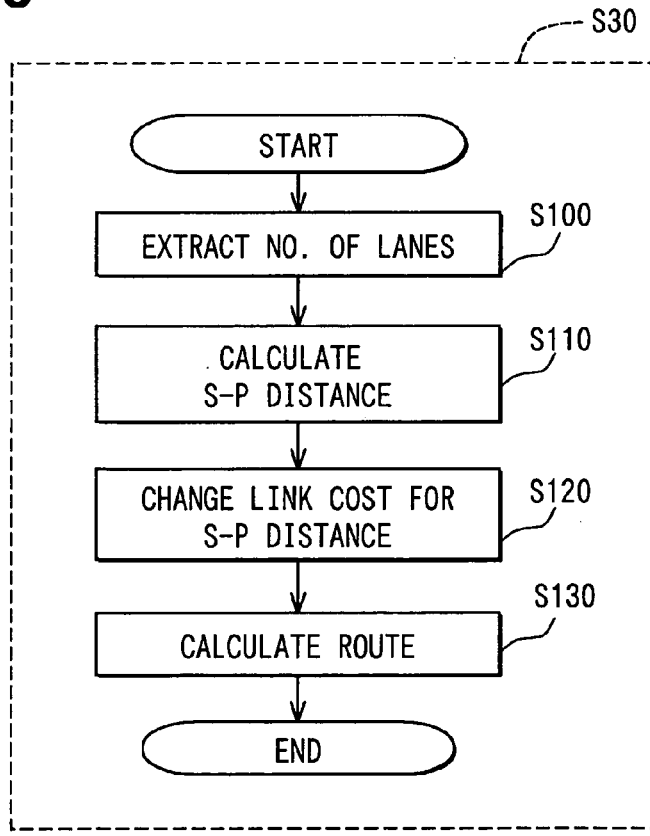
FIG. 3 is a flowchart showing a guided path calculation process according to a first embodiment.

With reference to flowcharts in FIGS. 2 and 3, the following describes processes of the route guidance function according to the embodiment. The embodiment assumes that the route guidance function is performed while a vehicle is running.

At Step 10 in FIG. 2, the process specifies a destination. At Step 20, the process obtains a vehicle's current position from the position detector 1. At Step 30, the process calculates a guided path from the current position to the destination. At Step 40, the process provides a guidance according to the calculated path. With reference to the flowchart in FIG. 3, the following describes the guided path calculation process at Step 30.

At Step 100 in FIG. 3, the process extracts the number of lanes for links constituting the road for the current position from the link data. At Step 110, the process calculates the straight prioritized distance corresponding to the number of lanes extracted. At Step 120, the process specifies a best followed road at the current position. The process further specifies, from all links constituting the specified best followed road, links corresponding to the straight prioritized distance ahead from the current position. The process then changes link costs of the specified links so that a small cost value should be assigned to the links corresponding to the straight prioritized distance of the best followed road. It may be preferable to change link costs so that large cost values should be assigned to links constituting a road other than the best followed road for the straight prioritized distance ahead from the current position. Alternatively, it may be preferable to prohibit entry to a link that constitutes a road other than the best followed road for the straight prioritized distance ahead from the current position. At Step 130, the process calculates a route to the destination from the current position.

At Step 120, the best followed road is specified at the current position. The specification method specifies a vehicle's traveling direction based on an output signal from the position detector 1. A road extending toward the traveling direction is specified to be the best followed road. Further, there may be a case where the best followed road branches. In such case, a branched road specified to be the best followed road should have the same road type as that of the best followed road at the current position. Alternatively, the direction of extending the link immediately after the branch should most approximate the direction of extending the link constituting the best followed road immediately before the branch.

The navigation system 100 according to the embodiment changes the straight prioritized distance for the best followed road included in the route corresponding to the number of lanes at the vehicle's current position. This solves the problem resulting from the moving of the vehicle's current position from the start point of the calculated path as follows. When there are many lanes at the start point, the straight prioritized distance is sufficient to change lanes. Therefore, calculating of a path that causes a guide to sudden right or left turn is eliminated. When there are a few lanes, the straight prioritized distance becomes short. Therefore, calculating of a roundabout route to the destination is eliminated. As a result, calculation of a route favorable to the driver is enabled.

The embodiment has described the processes for performing the route calculation by setting a destination while the vehicle is running. Further, the route calculation processes may be applied to performing the route reretrieval function. This function automatically forms a new route to the destination when the vehicle deviates from the guided path during the route guidance.

Modification 1

The embodiment finds a straight prioritized distance based on the number of lanes at the current position. Further, it may be preferable to find the straight prioritized distance based on a road width at the current position. For example, a storage device such as ROM is used to previously store the correspondence between a road width and a straight prioritized distance as shown in FIG. 14. The straight prioritized distance can be found by applying the road width to the correspondence. As shown in FIG. 14, the straight prioritized distance increases as the road width increases. Consequently, it is possible to set a straight prioritized distance corresponding to the road width.

Second Embodiment

The second embodiment has many common points with the first embodiment. The following describes chiefly describes different points and omits a detailed description about the common points.

The guided path calculation process according to the first embodiment finds a straight prioritized distance based on the number of lanes at the vehicle's current position. The guided path calculation process according to the second embodiment differs from that of the first embodiment as follows. Let us suppose a distance from the current position to a point to branch to another road from the best followed road. It is assumed that the distance is longer than the straight prioritized distance found from the number of lanes for a link immediately before the branch point. In this case, the straight prioritized distance is assumed to be that found from the number of lanes for the link immediately before the branch point.

Figure 7:
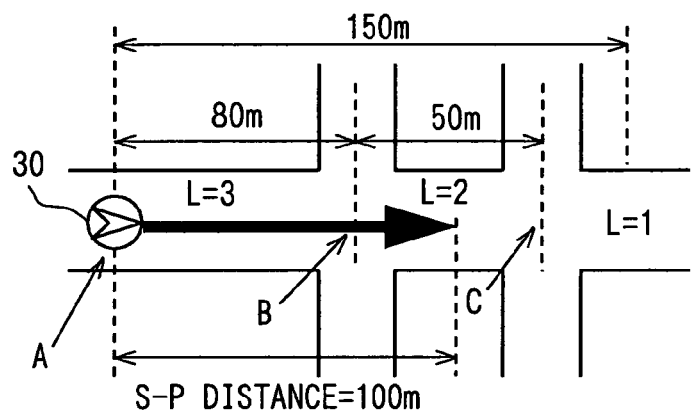
FIG. 7 shows an image of straight prioritized distance according to the second embodiment.

FIG. 7 provides a specific example to help understanding of this concept. There is a distance of 80 m from current position A of the vehicle 30 to point B first crossing another road in the traveling direction. On the other hand, three lanes are provided for a link immediately before point B. Therefore, according to FIG. 13, it is determined that three lanes need the straight prioritized distance of 150 m. The distance of 80 m from the current position to point B is shorter than the straight prioritized distance of 150 m. Accordingly, the straight prioritized distance needs to be specified at a point ahead from point B.

Then, there is a distance of 130 m from the current position to point C next crossing yet another road in the traveling direction. On the other hand, two lanes are provided for a link immediately before point B. Therefore, according to FIG. 13, it is determined that two lanes need the straight prioritized distance of 100 m. The distance of 130 m from the current position to point C is longer than the straight prioritized distance of 100 m. Accordingly, the straight prioritized distance can be specified at a point 100 m from the current position.

Figure 4:
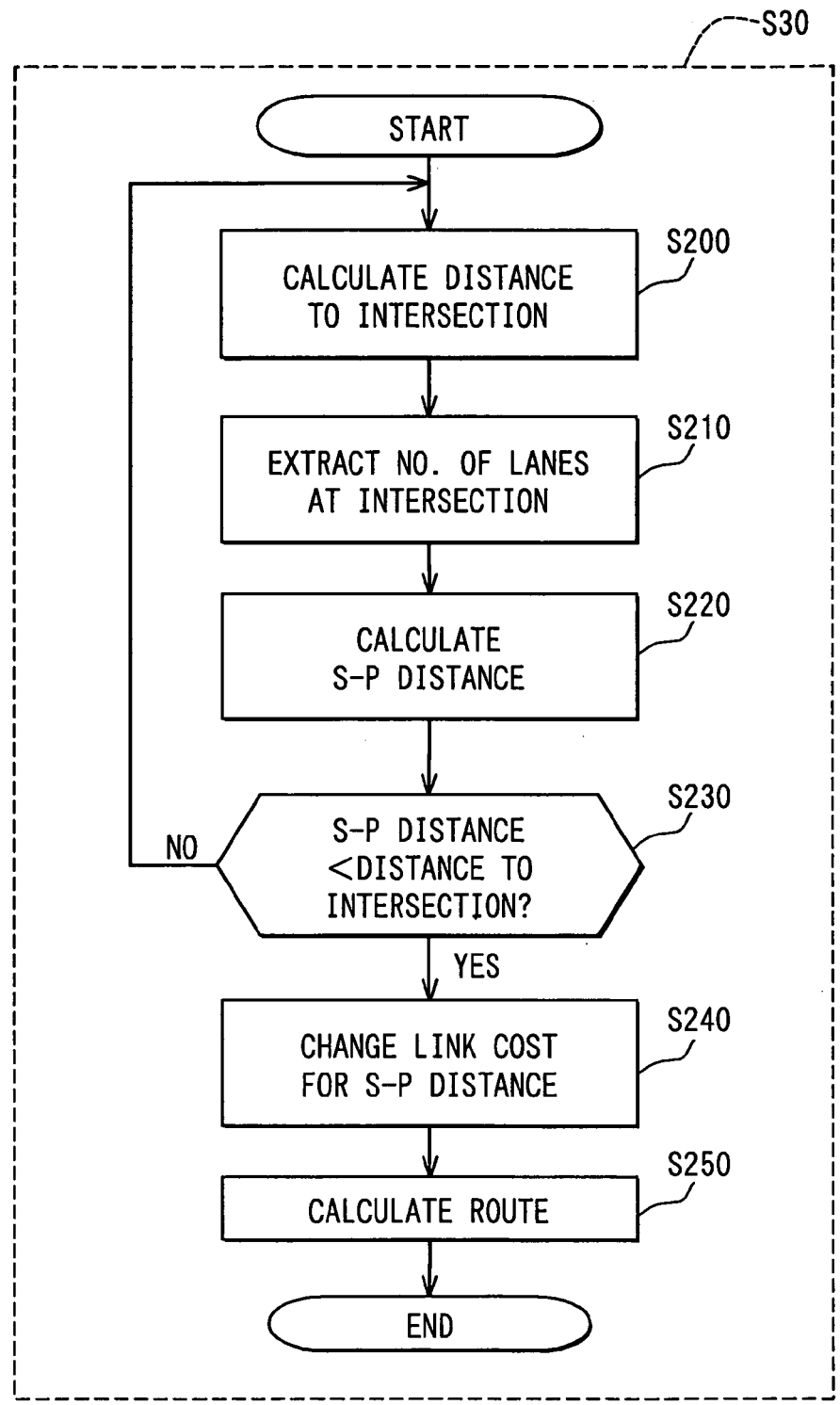
FIG. 4 is a flowchart showing a guided path calculation process according to a second embodiment.

With reference to the flowchart in FIG. 4, the following describes the guided path calculation process according to the embodiment. It is assumed that the best followed road is predetermined at the current position.

At Step 200 in FIG. 4, the process calculates a distance from the vehicle's current position to the first intersection in the traveling direction. At Step 210, the process extracts the number of lanes for a link immediately before the intersection.

At Step 220, the process calculates the straight prioritized distance corresponding to the number of lanes extracted at Step 210. At Step 230, the process determines whether or not the distance from the current position to the intersection is longer than the straight prioritized distance. If the determination is affirmative, the process advances to Step 240. If the determination is negative, the process advances to Step 200. The above-mentioned process is repeated for the next intersection ahead from the current position.

At Step 240, the process changes to decrease cost values assigned to links constituting the best followed road from the current position to the point at the straight prioritized distance ahead. At Step 250, the process calculates a route from the current position to the destination.

With respect to the navigation system 100 according to the embodiment, we suppose a distance from the current position to a point to branch to another road from the best followed road. Suppose that the distance is longer than the straight prioritized distance found from the number of lanes for a link immediately before the branch point. In this case, the straight prioritized distance is assumed to be that found from the number of lanes for the link immediately before the branch point. This makes it possible to find a straight prioritized distance based on the number of lanes for a link constituting the best followed road ahead from the current position.

Modification 2

The embodiment finds a straight prioritized distance based on the number of lanes. It may be also preferable to find the straight prioritized distance based on a road width. This makes it possible to find the straight prioritized distance based on the link width ahead from the current position.

Third Embodiment

The third embodiment has many common points with the second embodiment. The following describes chiefly describes different points and omits a detailed description about the common points.

With respect to the guided path calculation process according to the second embodiment, we suppose a distance from the current position to a point to branch to another road from the best followed road. It is assumed that the distance is longer than the straight prioritized distance found from the number of lanes for a link immediately before the branch point. In this case, the straight prioritized distance is assumed to be that found from the number of lanes for the link immediately before the branch point.

By contrast, the guided path calculation process according to the third embodiment differs from that of the second embodiment as follows. That is, the process finds a straight prioritized distance from the number of lanes for each link constituting the best followed road. The process then adds percentages of the link lengths according to a sequence of links configured along the direction toward the destination from the current position. Finally, the process assumes that the straight prioritized distance should be measured from the current position to a point on a link to be added to reach the specified sum of percentages.

Figure 8:
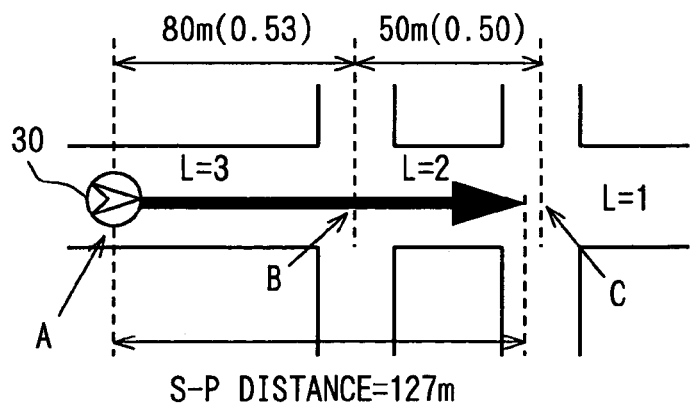
FIG. 8 shows an image of straight prioritized distance according to the third embodiment.

As shown in FIG. 8, for example, there are three lanes at point A as the current position of the vehicle 30. The straight prioritized distance at point A is found to be 150 m from FIG. 13. However, a link length is 80 m from point A to point B in which interval the number of lanes is three. This means that the interval from point A to point B is only ensured approximately 53% (80/150=0.53) of the 150 m straight prioritized distance to be traveled along the best followed road.

The process references a link connecting to the link from point A to point B toward the destination to ensure the remaining 47% to be traveled along the best followed road. The embodiment determines whether or not to be able to ensure the remaining approximately 47% from the link from point B to point C.

According to the example in FIG. 8, two lanes are defined from point B to point C. Therefore, the straight prioritized distance is found to be 100 m from FIG. 13. In addition, the link length is 50 m from point B to point C. This interval is approximately 50% (50/100=0.5) of the 100 m straight prioritized distance to be traveled along the best followed road.

Consequently, it becomes clear that an interval from point B to point c contains a point to ensure 100% of the straight prioritized distance to be traveled from the current position along the best followed road. A distance from the current position to that point is found to be 127 m (=150×[80/150]+ 100×[1−80/150]). This distance is defined to be the straight prioritized distance.

Figure 5:
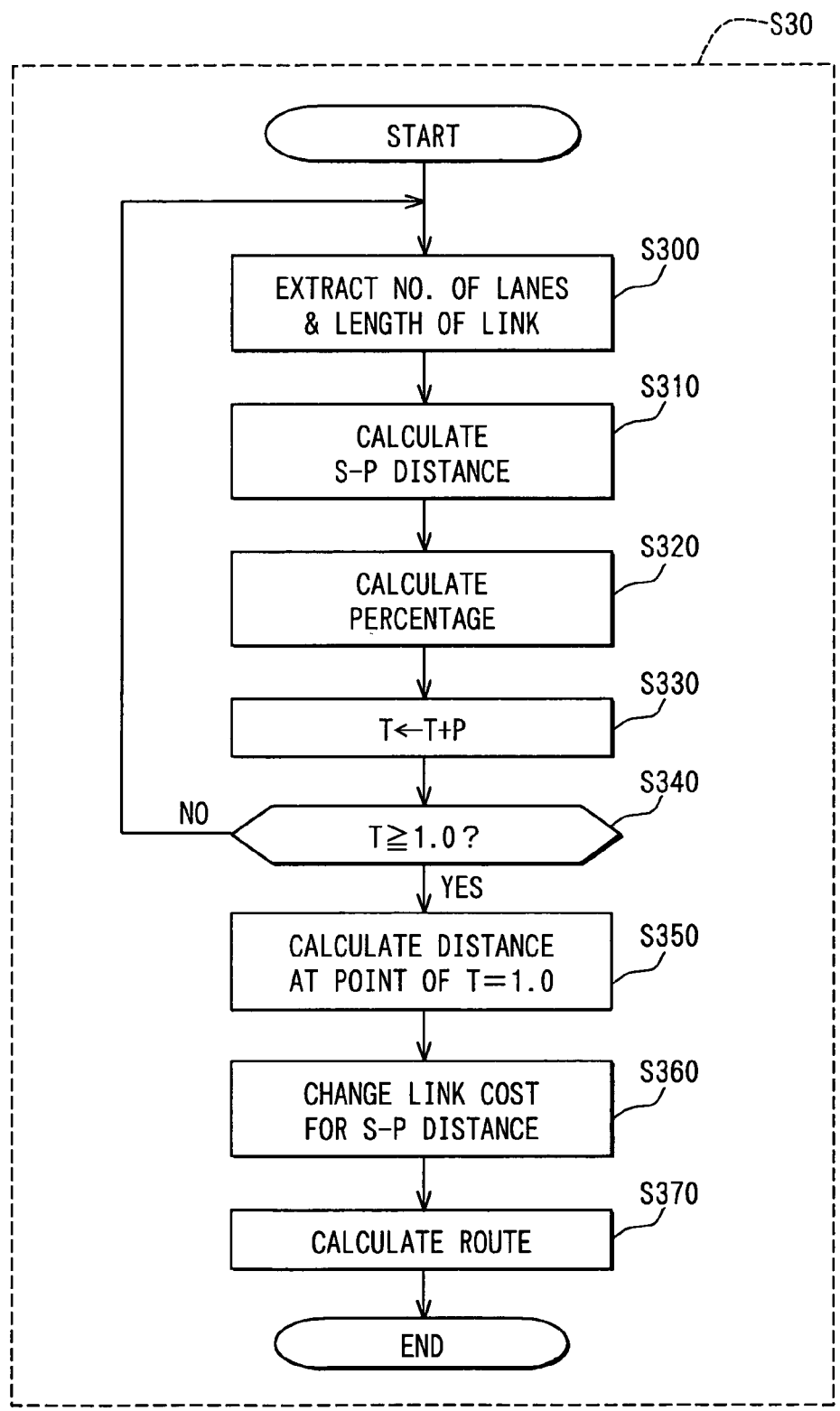
FIG. 5 is a flowchart showing a guided path calculation process according to a third embodiment.

With reference to the flowchart in FIG. 5, the following describes the guided path calculation process according to the embodiment. It is assumed that the best followed road is predetermined at the current position.

At Step 300, the process extracts the number of lanes for a link and the length of this link that constitutes the best followed road at the current position. The first process at Step 300 extracts the number of lanes and the length of the link at the current position. Each time Step 300 is repeated thereafter, the process changes links to extract the link data according to the sequence of link configuration from the current position toward the destination.

At Step 310, the process calculates the straight prioritized distance corresponding to the number of lanes extracted. At Step 320, the process calculates a percentage (P) of the link length in the straight prioritized distance calculated at Step 310. Specifically, the percentage is found by dividing the link length by the straight prioritized distance.

At Step 330, the process adds percentage (P) to variable (T) and substitutes the addition result for variable (T). An initial value for variable (T) is set to 0. At Step 340, the process determines whether or not variable (T) is greater than or equal to 1.0. If the determination is affirmative, the process advances to Step 350. If the determination is negative, the process advances to Step 300. The above-mentioned process is repeated At Step 350, the process calculates a distance (straight prioritized distance) from the current position corresponding to variable (T) of 1.0. At Step 360, the process changes to reduce a cost value assigned to each of links constituting the best followed road at the current position. The best followed road is measured at the straight prioritized distance found at Step 350 ahead from the current position. At Step 370, the process calculates a route to the destination from the current position.

In this manner, the navigation system 100 according to the embodiment finds a straight prioritized distance from the number of lanes for each link constituting the best followed road. The percentages of the link lengths with respect to the respective corresponding straight prioritized distances are repeatedly added according to a sequence of links configured along the direction toward the destination from the current position. Finally, when the added percentages (T) reach the specified sum of percentages (e.g., 100%), the straight prioritized distance is assumed to be measured from the current position to a point on a link to be added to reach the specified sum of percentages.

In this manner, the straight prioritized distance can be found in accordance with not only the number of lanes for the link at the current position, but also the number of lanes for each of links ahead from the current position. It becomes possible to optimally ensure a distance from the vehicle's current position at the start of the route guidance to a point to turn right or left on the route. As a result, it is possible to provide a route guidance favorable to the driver.

Modification 3

The embodiment finds a straight prioritized distance based on the number of lanes for a link. It may be also preferable to find the straight prioritized distance based on a road width. Consequently, a distance of the best followed road can be found in accordance with not only the link width at the start point, but also the other link widths ahead from the start point, for example. An operation/working-effect similar to the embodiment can be expected.

Fourth Embodiment

Figure 9:
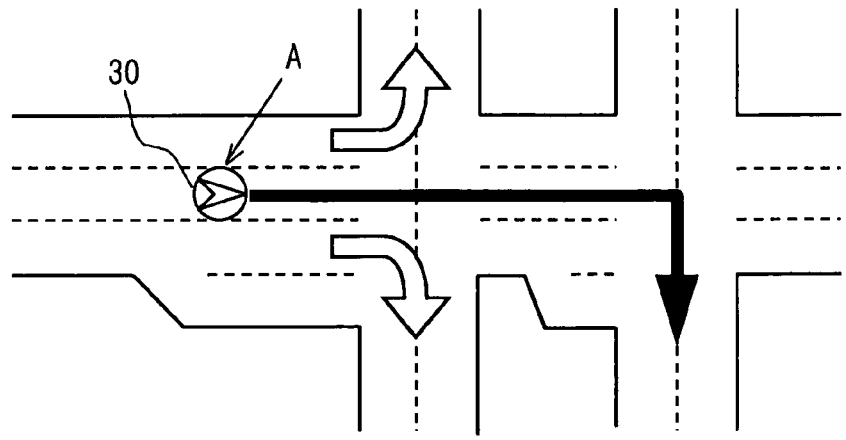
FIG. 9 shows an image of a road having an exclusive right-turn lane according to a fourth embodiment.

The first to third embodiments are based on the number of lanes for links constituting the best followed road. FIG. 9 shows a link constituting a road through a city, for example. Such link may have an exclusive right-turn or left-turn lane. When the link has an exclusive right-turn or left-turn lane, the number of lanes for links may contain exclusive right-turn and left-turn lanes. Therefore, it is possible to find a straight prioritized distance based on the number of lanes that may be changed by the vehicle.

Let us consider the following case. After a best followed road is specified to the destination from the current position, the destination is not found along the best followed road. To reach the destination, it is necessary to calculate a route to turn right or left to another road from the best followed road. In such case, it is a good practice to allocate only the exclusive right-turn or left-turn lane to the number of lanes for the link. In this manner, the number of lanes for the link includes an exclusive lane to be passed when turning right or left from the best followed road. Accordingly, it is possible to find the best followed road based on the number of lanes a vehicle may change along their direction.

Like in the above-mentioned case, the destination is not found along the best followed road. To reach the destination, it is necessary to calculate a route to turn right or left to another road from the best followed road. In such case, it may be preferable to find the best followed road based on the number of lanes to be moved when the vehicle turns right or left from the lane at the current position.

As shown in FIG. 9, for example, it may be necessary to turn right from the best followed road at the current position to reach the destination. In this case, there are three lanes to be moved including the current vehicle's lane to turn right from point A. On the other hand, when the vehicle needs to turn left from point A to reach the destination, there are two lanes to be moved including the current vehicle's lane. In this manner, the best followed road is found based on the number of lanes to be moved from the vehicle's current position. This makes it possible to appropriately ensure a distance from the current position to the point for right or left turn after changing lanes.

Fifth Embodiment

The first to fourth embodiments find the straight prioritized distance based on the number of lanes for links constituting the best followed road. When the best followed road is congested, however, a lane change is expected to be complete at a relatively short traveling distance. Accordingly, the best followed road can be shortened.

Figure 10:
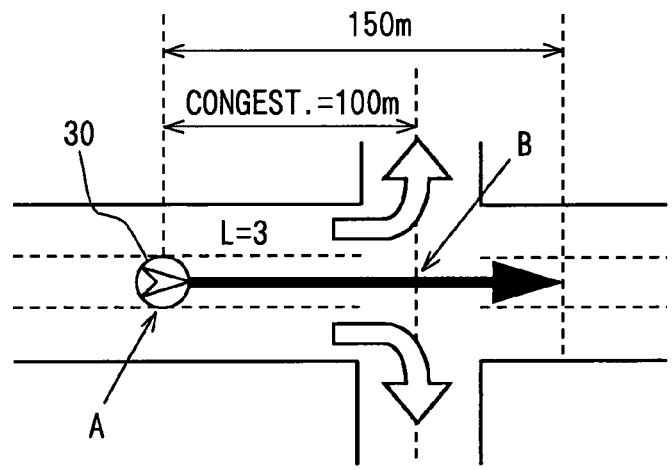
FIG. 10 shows an image of straight prioritized distance to be calculated according to a fifth embodiment in consideration for a congested road.

As shown in FIG. 10, for example, there are three lanes from point A of the current position of the vehicle 30 to point B. As shown in FIG. 13, the straight prioritized distance of 150 m is found from the number of lanes for the link at the current position. When traffic congestion occurs for a distance of 100 m ahead from point A, the vehicle 30 can relatively easily change lanes for right or left turn. The following equation is used to correct the straight prioritized distance at point A in consideration for a traffic congestion level and the length of traffic congestion.

Straight prioritized distance=(Straight prioritized distance based on the number of lanes)−(Length of traffic congestion)+(Length of traffic congestion/Traffic congestion coefficient)  [Equation 1]

In this equation, the traffic congestion coefficient corresponds to a traffic congestion level obtained from the VICS receiver 14. For example, the coefficients can be predetermined as being congested=2.0, crowded=1.5, empty=1.0, and the like. In this manner, the straight prioritized distance is corrected in consideration for the degree of traffic congestion. This eliminates the need to calculate a roundabout route to the destination.

Sixth Embodiment

The first to fifth embodiments find the straight prioritized distance based on the number of lanes for links constituting the best followed road. Further, it may be preferable to correct the straight prioritized distance in consideration for road types of links. That is, the ease of changing lanes for a road is considered to depend on the road types such as the toll road, the national road, and the road designated for prefectural and city governments and villages. For this reason, the straight prioritized distance is corrected in accordance with the road type.

Figure 11:
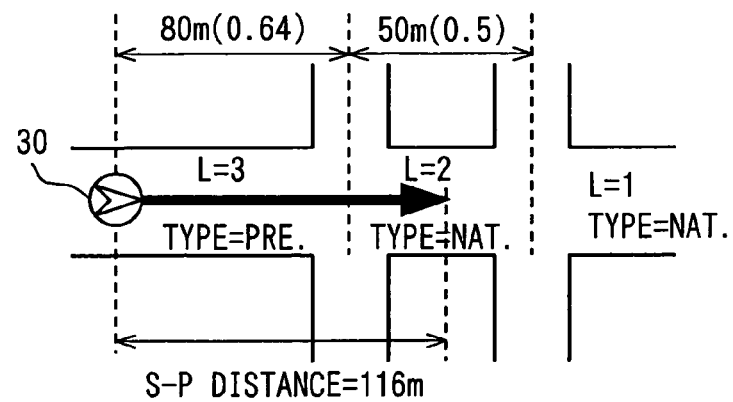
FIG. 11 shows an image of straight prioritized distance to be calculated according to a sixth embodiment in consideration for road types.

FIG. 11 shows an example of considering the road type according to the sixth embodiment. As shown in FIG. 11, there are three lanes at the current position A of the vehicle 30. Therefore, the straight prioritized distance at point A is found to be 150 m from FIG. 13. The link length of 80 m corresponds to an interval between points A and B provided with three lanes. The following equation is used to find a ratio of the interval between points A and B to the straight prioritized distance of 150 m in consideration for the road type (prefectural road) of this interval.

Ratio of interval=(Link length)×(Road type coefficient/Straight prioritized distance based on the number of lanes) [Equation 2]

The road type coefficient in this equation can be predetermined as toll road=0.5, national road=1.0, road designated for prefectural and city governments=1.2, and others=2.0, for example. The equation yields approximately 64% (80×1.2/150=0.64) as the ratio of the interval between points A and B to the straight prioritized distance.

It is necessary to ensure the remaining approximately 36% to be traveled along the best followed road. To do this, it is determined whether or not to be able to ensure the remaining approximately 36% based on the link length and the road type.

In the example of FIG. 11, the number of lanes is set to 2 for the interval between points B and C. Accordingly, the straight prioritized distance is found to be 100 m from FIG. 13. The link length between points B and C is 50 m. The interval is assigned to the road type of national road (road coefficient=1.0). The interval between points B and C can be provided with approximately 50% (50×1.0/100=0.5) of the 100 m straight prioritized distance to be traveled along the best followed road.

Therefore, it is made clear that the interval between points B and C contains a point to ensure 100% of the straight prioritized distance to be traveled along the best followed road from the current position. A distance to that point from the current position is found to be 116 m (=80+(1−0.64)× 100/1.0) and is defined to be the straight prioritized distance. Consequently, it is possible to find the straight prioritized distance in consideration for the ease of lane change.

In the first and second embodiment, it is a good practice to correct the straight prioritized distance based on road types by dividing the calculated straight prioritized distance by the road type coefficient.

Seventh Embodiment

When the best followed road contains an intersection in the first to sixth embodiments, the straight prioritized distance may be modified according to the number of intersections. When passing through an intersection, for example, the vehicle may stop or decelerate at the intersection in order to wait for the light to change or temporarily stop for confirmation. Such situation makes it possible to easily change lanes for right or left turn. As an example, FIG. 12 shows a case where the straight prioritized distance includes a point to intersect, branch to, or join another road. In this case, a specified distance (e.g., 20 m) is subtracted from the straight prioritized distance per intersection. In this manner, the straight prioritized distance can be specified in accordance with an actual road situation.

Eighth Embodiment

Moreover, in the first to seventh embodiments, the straight prioritized distance may be corrected in consideration for a vehicle's speed at the current position. That is, it is possible to estimate a distance traveled by the vehicle during the route calculation based on a vehicle's speed at the current position and the time needed for the route calculation by the navigation system.

For this purpose, the estimated travel distance is compared to the straight prioritized distance. When the travel distance is longer than the straight prioritized distance, the former is changed to the latter, for example. In this manner, the straight prioritized distance can be corrected in consideration for the vehicle's speed. As a result, the straight prioritized distance can take into account the vehicle's current position at the start of the route guidance.

It will be obvious to those skilled in the art that various changes may be made in the above-described embodiments of the present invention. However, the scope of the present invention should be determined by the following claims.

What is claimed is:

1. A navigation system comprising:
    a road map data storage for storing map data including road attribute data;
    a route calculation unit for calculating a route from a current position to a destination by using the map data stored in the road map data storage unit, wherein the route includes a road to be followed from the current position;
    a route guidance unit for performing a route guidance to the destination in accordance with the route calculated by the route calculation unit; and
    a change unit for changing a distance of the road to be followed included in the route according to a road attribute of the road to be followed, wherein the road attribute is included in the road attribute data stored in the road map data storage unit,
    wherein, when the route calculation unit sets a branch point for branching to another road from the road to be followed, the branch point is set after the distance is exceeded.

2. The navigation system of claim 1,
    wherein the map data includes link data specifying roads; and
    wherein the attribute data is associated with each link in the link data.

3. The navigation system of claim 2,
    wherein, when the road to be followed has at least one exclusive lane of right-turn and left-turn lanes, the change unit includes the exclusive lane in the number of lanes for the road to be followed.

4. The navigation system of claim 2,
wherein, when the destination is not found along the road to be followed and the route calculation unit needs to calculate a route branching to another road from the road to be followed, and when the road to be followed has an exclusive right-turn or left-turn lane along a direction of branching to another road from the road to be followed, the change unit includes the exclusive lane in the number of lanes.

5. The navigation system of claim 1,
wherein the road map data storage unit stores a number of lanes for a road included in the map data as the road attribute data; and
wherein the change unit changes the distance in accordance with a number of lanes for the road to be followed.

6. The navigation system of claim 1, further comprising:
a position detection unit for detecting a current position; and
a lane position specification unit for specifying a lane position on a road at the current position detected by the position detection unit by using the map data,
wherein, when the destination is not found along the road to be followed and the route calculation unit needs to calculate a route branching to another road from the road to be followed, the change unit assumes a number of lanes that are moved for branching to another road from the current position to be a number of lanes immediately before a corresponding branch point, and
wherein the change unit changes the distance in accordance with the assumed number of lanes immediately before the corresponding branch point.

7. The navigation system of claim 1,
wherein the change unit predetermines a reference distance that is a distance of the road to be followed in accordance with the number of lanes for the road to be followed; and
wherein the reference distance is configured to increase as the number of lanes increases.

8. The navigation system of claim 7,
wherein the change unit predetermines the reference distance in accordance with the number of lanes of the road to be followed at the current position.

9. The navigation system of claim 7,
wherein the change unit predetermines the reference distance in accordance with the number of lanes at a point capable of branching to another road from the road to be followed.

10. The navigation system of claim 7,
wherein, when each of portions constituting the road to be followed has an individual number of lanes and a ratio of a length of the each portion to the reference distance according to the individual number of lanes, the ratios for the portions are summed up until a specified value is reached in accordance with a sequence of the portions toward the destination from the current position, the change unit determines a point on the road to be followed to reach the specified value and assumes a distance from the current position to the point to be the reference distance.

11. The navigation system of claim 1,
wherein the road map data storage unit stores a road width for a road included in the map data as the road attribute data; and
wherein the change unit changes the distance in accordance with a road width for the road to be followed.

12. The navigation system of claim 1,
wherein the change unit predetermines a reference distance that is a distance of the road to be followed in accordance with the road width for the road to be followed; and
wherein the reference distance is configured to increase as the road width increases.

13. The navigation system of claim 12,
wherein the change unit predetermines the reference distance in accordance with the road width of for the road to be followed at the current position.

14. The navigation system of claim 12,
wherein the change unit predetermines the reference distance in accordance with the road width at a point capable of branching to another road from the road to be followed.

15. The navigation system of claim 12,
wherein, when each of portions constituting the road to be followed has an individual, road width and a ratio of a length of the each portion to the reference distance according to the individual road width, the ratios for the portions are summed up until a specified value is reached in accordance with a sequence of the portions toward the destination from the current position, the change unit determines a point on the road to be followed to reach the specified value and assumes a distance from the current position to the point to be the reference distance.

16. The navigation system of claim 1, further comprising:
a traffic congestion information acquisition unit for acquiring, from outside, traffic congestion information including a position, a length, and a traffic congestion level of a congested road,
wherein, when the road to be followed includes the congested road acquired by the traffic congestion information acquisition unit, the change unit changes the distance of the road to be followed in accordance with the traffic congestion information corresponding to the congested road.

17. The navigation system of claim 1,
wherein the road map data storage unit stores a road type for a road included in the map data as the road attribute data; and
wherein the change unit changes the distance in accordance with a road type for the road to be followed.

18. The navigation system of claim 1,
wherein the change unit changes the distance of the road to be followed in accordance with a number of points to intersect, branch to, and join another road from the road to be followed.

19. The navigation system of claim 1, further comprising:
a vehicle speed detection unit for detecting a vehicle speed of a vehicle having the navigation system,
wherein the change unit changes the distance of the road to be followed in consideration for the vehicle speed detected by the vehicle speed detection unit.

* * * * *